(12) United States Patent
Davis et al.

(10) Patent No.: US 6,321,312 B1
(45) Date of Patent: Nov. 20, 2001

(54) SYSTEM AND METHOD FOR CONTROLLING PERIPHERAL DEVICE MEMORY ACCESS IN A DATA PROCESSING SYSTEM

(75) Inventors: Gordon Taylor Davis, Chapel Hill; Llewellyn Bradley Marshall, IV, Cary, both of NC (US); Clarence Rosser Ogilvie, Huntington; Paul Colvin Stabler, South Burlington, both of VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/108,896

(22) Filed: Jul. 1, 1998

(51) Int. Cl.$^7$ ..................................... G06F 12/00
(52) U.S. Cl. .............................. 711/163; 711/4; 711/137; 711/167
(58) Field of Search ............................... 711/4, 137, 163, 711/125, 118, 167; 710/8, 38, 22, 28; 712/233, 241; 709/318

(56) References Cited

U.S. PATENT DOCUMENTS

| | | |
|---|---|---|
| 4,031,521 | 6/1977 | Hall et al. ............................ 364/200 |
| 4,241,416 | 12/1980 | Tarczy-Hornoch .................. 364/900 |
| 4,626,988 | 12/1986 | George ................................ 364/200 |
| 5,036,454 | 7/1991 | Rau et al. ............................ 364/200 |
| 5,305,357 | 4/1994 | Ekeroth ............................... 376/254 |
| 5,317,743 | 5/1994 | Imai et al. ........................... 395/700 |
| 5,491,823 | 2/1996 | Ruttenberg ......................... 395/700 |
| 5,511,178 | * 4/1996 | Takeda et al. ...................... 711/125 |
| 5,524,223 | 6/1996 | Lazaravich et al. ................ 395/375 |
| 5,799,207 | * 8/1998 | Wang et al. .......................... 710/35 |
| 5,978,860 | * 11/1999 | Chan et al. ............................ 710/8 |
| 6,016,531 | * 1/2000 | Rixner et al. ....................... 711/118 |
| 6,032,252 | * 2/2000 | Petro et al. ......................... 712/233 |

\* cited by examiner

Primary Examiner—Matthew Kim
Assistant Examiner—Fred F. Tzeng
(74) Attorney, Agent, or Firm—John B. Frisone

(57) ABSTRACT

A cache based processing system is provided with a loop detection circuit for detecting the entry into and termination of program loops and for enabling peripheral device access to the main memory after completion of the first pass through the loop and terminating access when the program leaves the loop.

8 Claims, 4 Drawing Sheets

SYSTEM AND METHOD FOR CONTROLLING PERIPHERAL DEVICE MEMORY ACCESS IN A DATA PROCESSING SYSTEM

BACKGROUND OF THE INVENTION

In processor designs using intelligent peripheral devices which take control of the processor memory bus, either on their own or through a separate Direct Memory Access (DMA) controller, in order to transfer data between the peripheral device and the memory, priority is typically given to the peripheral device. Periodically this results in denying the processor access to the memory which causes a loss in processor performance. While a cache based system is able to overcome some of the losses, some will occur when the processor is stalled waiting for instructions or data not yet in the cache. This results in a statistical system performance which is based on the probability of simultaneous conflicting requests. As the bandwidth requirements of the peripheral devices increase, the statistical performance of the processor deteriorates. In systems with hard real-time requirements, such as digital signal processors, system design must assume that there will always be a conflict in order to assure adequate processor performance for the timely completion of real-time tasks.

As long as the processor is operating in the same memory page, access times to retrieve instructions or data are relatively short and deterministic. The program will normally operate within the same memory page with an occasional need to move to a different page. However, when a peripheral device accesses the memory it typically forces the memory to another page. After the peripheral device has completed, the program incurs additional delay in changing back to the original memory page. Short and frequent peripheral device access to the memory can cause additional non-deterministic processor overhead due to the extra access times required for frequent moves from one memory page to another.

SUMMARY OF THE INVENTION

The invention contemplates a method and system for controlling data transfers between a peripheral device and a random access memory in a cache-based processing system in order to minimize interference with program execution. The system includes means for detecting when a program executing in a processor has entered a processing loop and has completed at least one pass through the processing loop. At the completion of the at least one pass through the processing loop authorizing access to random access memory by the peripheral device and means for monitoring the operation of the program to detect termination of loop processing and withdrawing authorization of access to the random access memory previously granted to the peripheral device.

DETAILED DESCRIPTION OF THE INVENTION

Figure 1:
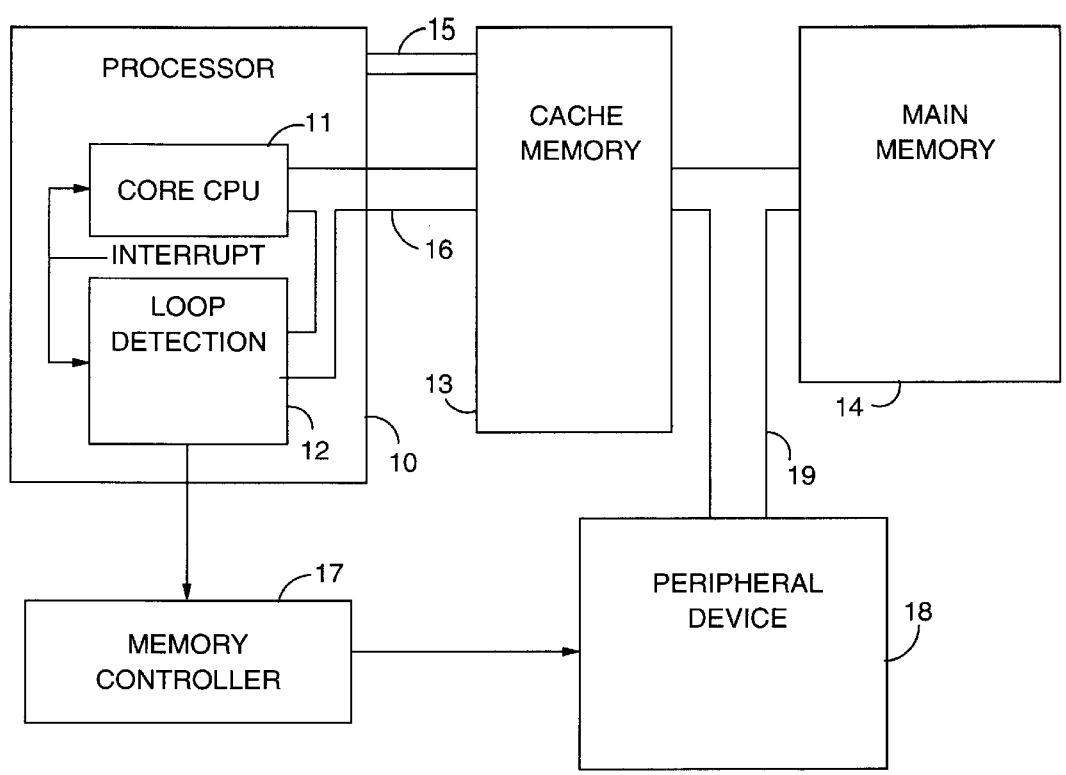
FIG. 1 is a block diagram illustrating a cache-based processing system using the invention.

In FIG. 1 a processor 10 which includes a core central processing unit (CPU) 11 and a loop detection circuit 12 is connected to a cache memory 13 and a main memory 14 by a data bus 15 and an address bus 16. The loop detector circuit 12 is connected to a memory controller circuit 17 which controls access to main memory 14. A peripheral device 18 is connected to the main memory 14 by a memory bus 19 and is authorized access to the main memory by control signals received from the memory controller 17.

When a program executing in processor 10 enters a typical loop operation, the instructions required for executing the loop are moved from main memory 14 to cache memory 13 in the first iteration of the loop. Thereafter, successive iterations of the loop do not, with few exceptions, require additional fetching of instruction from main memory. During these intervals (loops subsequent to the first loop) the main memory is available (except for data access by the processor) to a peripheral device without impacting the performance of the processor. When loop detection circuit 12 detects the completion of the first iteration of a loop it sends a control signal to memory controller 17 which in turn authorizes access to main memory by the peripheral device 18. As soon as the loop terminates or an interrupt is issued by the processor the control signal from the loop detector 12 is terminated.

While active peripheral devices would be enabled to access main memory, processor access to data variables might also be required during this time. In order to accommodate this with a minimum impact on processor performance the main memory is partitioned into two banks. Instructions and I/O buffers used by the peripheral devices are located in the same bank while data is located in the other. Since the O/I buffers used by the peripheral devices are located in the same main memory bank, the loop detection and control described above will always avoid access contention between instruction fetching and peripheral access.

Figure 2:
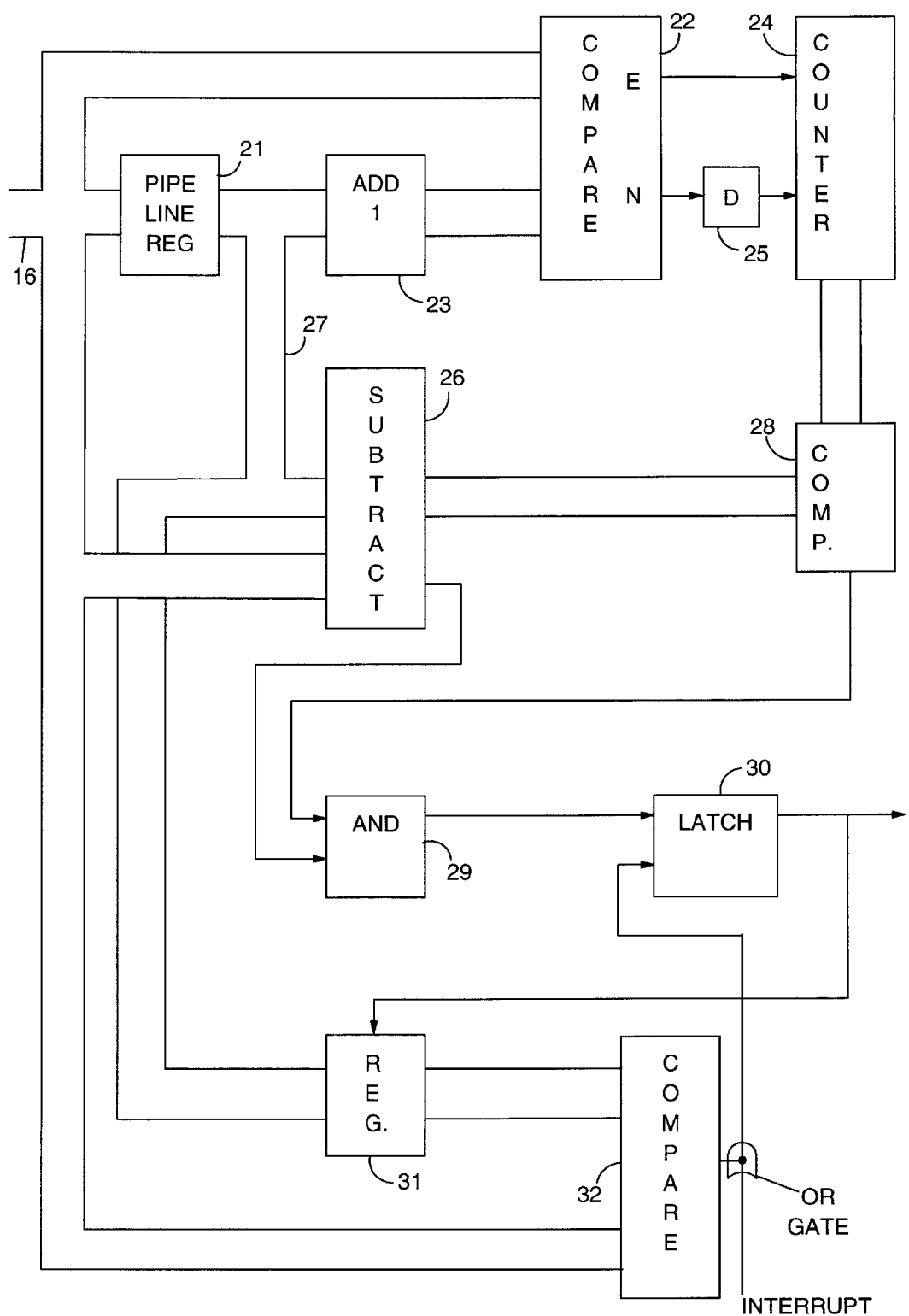
FIG. 2 is a detailed block diagram of the loop detection circuit illustrated in FIG. 1.

In FIG. 2, sequential instruction addresses on bus 16 are applied to a pipe line register 21 which introduces a one cycle delay and to one input of a comparison circuit 22. The output of register 21 on a bus 27 is incremented by one in circuit 23 and applied to the other input of compare circuit 22. If sequential instruction addresses differ by one, compare circuit 22 will provide an output E which is used to increment a counter 24. If they are not equal, circuit 22 will provide an output which will reset counter 24 after a delay 25.

A circuit 26 subtracts the current instruction address on bus 16 from the output of pipeline register 21 on bus 27. A comparison circuit 28 provides an output suitable for enabling an AND gate 29 when the value of counter 24 is greater than or equal to the numeric value of circuit 26. Circuit 26 also provides an output to AND gate 29 which indicates the sign of its numeric output and will satisfy AND gate 29 when the output of circuit 26 is a positive value.

If the processor has entered a loop, counter 24 will be incremented as each instruction is fetched and the output of subtract circuit 26 will be one (1) and negative until the loop completes and returns to the first instruction. At that time, the output of subtract circuit 26 will be a positive integer equal to or less than the value of counter 24 (which will depend on the value stored in pipe line register 21 when the program enters the loop) in view of the delay provided by circuit 25. That is, as loop back occurs inequality is detected by circuit 22, however because of the delay introduced by circuit 25 the output of compare circuit 28 maintains AND gate 29 enabled until the sign of circuit 26 goes positive. When this happens AND gate 29 sets a latch 30 which indicates the presence of a loop and is used to authorize peripheral memory access as described above.

The circuit thus far described detects the completion of the first iteration of a loop. The remainder, described below, is concerned with termination of a loop. A register 31 connected to bus 27 is loaded with the contents of bus 27 when the latch 30 is set. Since latch 30 is set when loop back occurs, the contents of bus 27 at that time, identifies the last instruction address in the loop and it is this address that is loaded into register 31. A comparison circuit 32 compares the contents of bus 16 with the output of register 31 and resets latch 30 when the address on bus 16 is greater than the last address of the loop provided by register 31. As described above, a processor interrupt will also reset latch 30 and terminate peripheral authorization.

Figure 3:
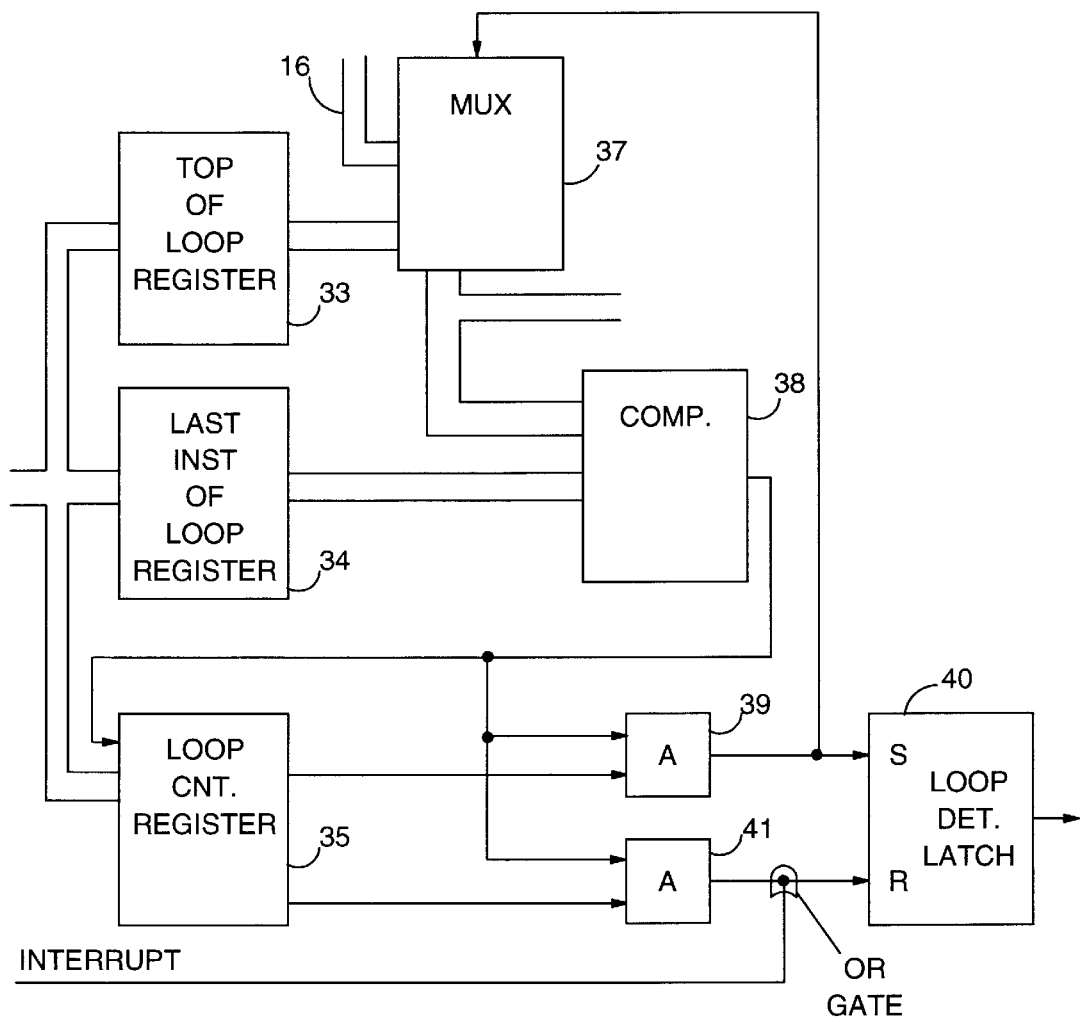
FIG. 3 is a detailed block diagram of an alternative loop detection circuit illustrated in FIG. 1 for use with special purpose processors (such as digital signal processors) which have built in hardware mechanisms for controlling loops and can provide information relative to loop execution.

An alternative loop detection circuit for use with processors which employ loop control hardware and can provide signals such as Top of Loop and Last Instruction Address and Loop Count is illustrated in FIG. 3. The Top and Last instruction addresses are loaded into registers 33 and 34, respectively. The loop count is loaded into a counter 35. The current instruction address from processor 10 on bus 16 is applied via a multiplexor 37 to one input of a compare circuit 38 where it is compared to the contents of register 34. When equality is detected, circuit 38 provides an output which is applied to an AND gate 39 and to counter 35 to decrement the count. As long as counter 35 is not zero AND gate 39 is enabled and provides an output to set a loop detected latch 40 after the first pass through the loop has completed.

The output of AND gate 39 is applied to the multiplexor 37 which switches the output of register 33 to the input of compare circuit 38. On the next cycle the top of loop instruction address from register 33 is applied to the input of circuit 38 and to the instruction address bus through multiplexor 37 forcing a branch. At this time circuit 38 detects inequality causing the output from AND gate 39 to fall. This causes multiplexor 37 to switch back to bus 16 where the process repeats until the loop count from counter 35 reaches zero at which time AND gate 41 resets loop detect latch 40.

Figure 4:
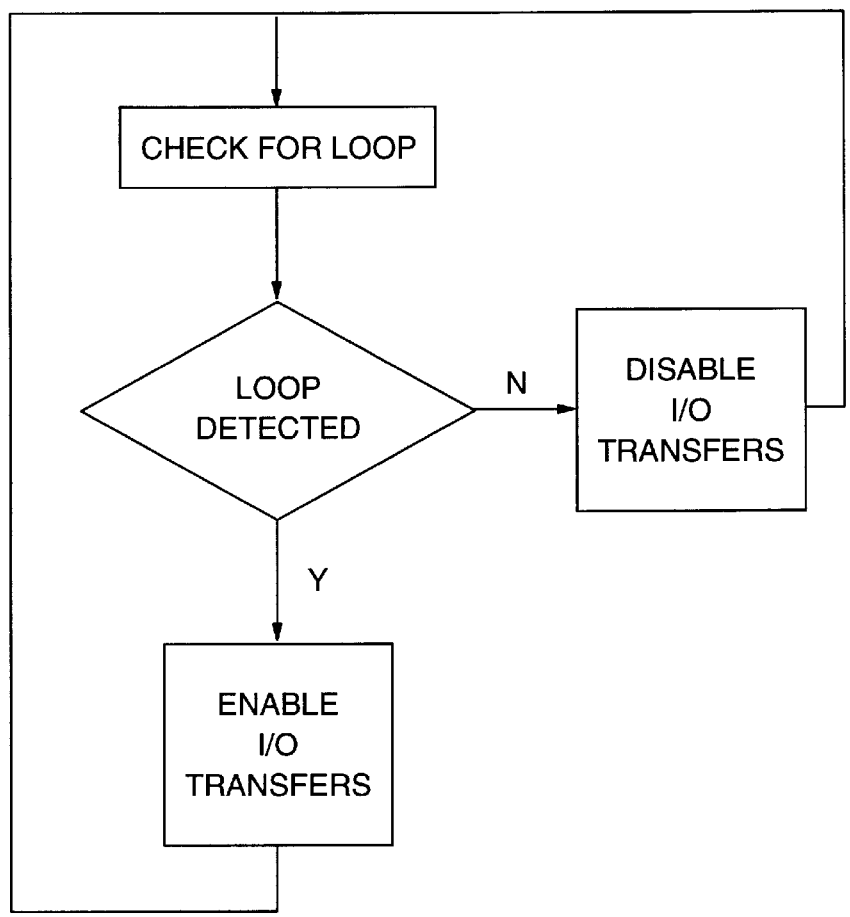
FIG. 4 is a flow diagram illustrating operation of the authorization mechanism.

The flow diagram illustrated in FIG. 4 defines the operation of the memory controller 17. The controller 17 in response to the loop detected signal enables peripheral device 1/0 transfers and disables the transfers when the loop detected signal is no longer present.

While several embodiments of the invention have been described and illustrated in detail it will be obvious to those skilled in this art that changes and modifications can be made without departing from the spirit and scope of the invention as set forth in the claims.

We claim:

1. A method for controlling data transfers between a peripheral device and a random access memory in a cache-based processor system comprising the steps:

detecting when a program executing in the processor has entered a processing loop and has completed at least one pass through the processing loop;

at the completion of the at least one pass through the processing loop authorizing access to random access memory by the peripheral device;

monitoring the operation of the program to detect termination of loop processing; and, terminating access authorization to the random access memory previously granted to the peripheral device when loop termination is detected.

2. A system for controlling data transfers between a peripheral device and a random access memory in a cache-based processor system comprising:

first means for detecting when a program executing in the processor has entered a processing loop and has completed at least one pass through the processing loop;

second means responsive to the first means for providing memory access authorization signals to the peripheral device at the completion of the at least one pass through the processing loop; and, third means for monitoring the operation of the program to detect termination of loop processing and providing a signal to the second means for terminating the authorization signals.

3. A system for controlling data transfers between a peripheral device and a random access memory in a cache-based processor system comprising:

first means for detecting when a program executing in the processor has entered a processing loop having a plurality of sequential instruction addressed appearing in an instruction address bus and has completed at least one pass through the processing loop;

second means responsive to the first means for providing memory access authorization signals to the peripheral device at the completion of the at least one pass through the processing loop; and, third means for monitoring the operation of the program to detect termination of loop processing and providing a signal to the second means for terminating the authorization signals.

4. The system set forth in claim 3 in which the first means includes:

first counting means for accumulating a count of numerically sequential instruction addresses and providing an output indicative thereof;

second arithmetic means for examining sequential instructions and providing a first predetermined output when the instruction addresses are numerically sequential and a second output if they are not sequential; and, third logic means responsive to the first counting and second arithmetic means for providing memory access authorization signals when their outputs have a predetermined relation.

5. The system set forth in claim 4 in which the second arithmetic means includes a circuit for subtracting a current instruction address from the next prior instruction address and providing an output indicative of the magnitude and the sign of the subtraction.

6. The system set forth in claim 5 in which the third logic means provides the authorization signal when the magnitude of the output from the first counting means is equal to or greater than the magnitude of the output from the second arithmetic means and the sign of the output is positive.

7. A system as set forth in claim 6 in which the third means for monitoring the operation of the program to detect termination of loop processing and providing a signal to the second means for terminating the authorization signals includes means for comparing the last instruction address in a loop to the current instruction address and for providing a signal to the second means when the current instruction address is greater than the last instruction address of the loop.

8. A method for controlling data transfers between a peripheral device and a random access memory in a cache-based processor system equiped with loop control hardware providing top of loop (TOL), last instruction address (LIA) and loop count (LC) signals comprising the steps:

comparing the current instruction address from the processor to the last instruction address (LIA);

at equality, decrementing the loop count (LC) by one, initiate authorization of data transfers between a peripheral device and the random access memory if the loop count (LC) is not zero and forcing a branch on the next instruction; and, repeating the above steps until the loop count (LC) reaches zero at which time terminating authorization of data transfers between the peripheral device and random access memory.

* * * * *